United States Patent
Kim

(10) Patent No.: US 10,063,833 B2
(45) Date of Patent: Aug. 28, 2018

(54) METHOD OF CONTROLLING STEREO CONVERGENCE AND STEREO IMAGE PROCESSOR USING THE SAME

(71) Applicant: Samsung Electronics Co., Ltd., Suwon-si (KR)

(72) Inventor: Irina Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 531 days.

(21) Appl. No.: 14/446,817

(22) Filed: Jul. 30, 2014

(65) Prior Publication Data

US 2015/0062297 A1     Mar. 5, 2015

(30) Foreign Application Priority Data

Aug. 30, 2013 (KR) .................. 10-2013-0104503

(51) Int. Cl.
*H04N 13/00* (2018.01)

(52) U.S. Cl.
CPC ... *H04N 13/0022* (2013.01); *H04N 2213/002* (2013.01)

(58) Field of Classification Search
CPC .................. H04N 13/0033; H04N 13/0022
See application file for complete search history.

(56) References Cited

U.S. PATENT DOCUMENTS

| | | |
|---|---|---|
| 8,243,124 B2 | 8/2012 | Choi et al. |
| 2008/0240549 A1* | 10/2008 | Koo ................ H04N 13/0018 382/154 |
| 2009/0096863 A1* | 4/2009 | Kim .................. G06K 9/00604 348/42 |
| 2009/0116732 A1* | 5/2009 | Zhou .................. H04N 13/0029 382/154 |
| 2010/0034260 A1* | 2/2010 | Shimizu ............... H04N 19/597 375/240.12 |
| 2010/0302355 A1 | 12/2010 | Tamaru |
| 2011/0169918 A1 | 7/2011 | Yoo |
| 2012/0063669 A1 | 3/2012 | Hong et al. |
| 2012/0087571 A1 | 4/2012 | Lee et al. |
| 2012/0098938 A1 | 4/2012 | Jin |
| 2012/0120202 A1 | 5/2012 | Yoon et al. |
| 2012/0257016 A1* | 10/2012 | Nakajima ............... G06T 17/20 348/46 |
| 2013/0113892 A1* | 5/2013 | Nakamaru ............. G03B 35/18 348/47 |

FOREIGN PATENT DOCUMENTS

| | | |
|---|---|---|
| KR | 10-1076406 B1 | 10/2011 |
| KR | 10-1109695 B1 | 1/2012 |
| KR | 10-2012-0019164 A | 3/2012 |
| KR | 10-2012-0095139 A | 8/2012 |

* cited by examiner

*Primary Examiner* — Tung Vo
*Assistant Examiner* — Rowina Cattungal
(74) *Attorney, Agent, or Firm* — Sughrue Mion, PLLC

(57) ABSTRACT

A method of controlling a stereo convergence and an image processor using the method are provided. The method includes: detecting objects from a stereo image; grouping the detected objects into at least one or more objects according to setup specification information; and moving at least one of left and right eye images of a stereo image of the grouping or a setup area including the grouping in a horizontal or vertical direction or in the horizontal and vertical directions.

17 Claims, 10 Drawing Sheets

Z+ : CROSSED DISPARITY

Z0 : ZERO DISPARITY [SCREEN]

Z− : UNCROSSED DISPARITY

METHOD OF CONTROLLING STEREO CONVERGENCE AND STEREO IMAGE PROCESSOR USING THE SAME

CROSS-REFERENCE TO RELATED APPLICATIONS

This application claims priority from Korean Patent Application No. 10-2013-0104503, filed on Aug. 30, 2013, in the Korean Intellectual Property Office, the disclosure of which is incorporated by reference herein in its entirety.

BACKGROUND

Field

Methods, apparatuses, devices, and articles of manufacture consistent with the present disclosure relate to a method and an apparatus for processing a 3-dimensional (3D) image signal, and more particularly, to a method of controlling stereo convergence and a stereo image process using the same.

Description of Related Art

In general, a 3D image includes left and right eye images and allows a user to perceive a sense of depth. The left and right eyes of a user see different images of the same object, and the two images are transmitted to the brain through retinas. Then, the brain fuses the two images to create a tridimensional image of the object according to image depth. If a distance between the left and right eye images is very short, a 3D effect is considerably low. On the other hand, if the distance between the left and right eye images is very long, the 3D effect is considerably enhanced. If the 3D effect is too low, the user may not be able to tridimensionally view an image. If the 3D effect is too strong, the user suffers from eye fatigue.

SUMMARY

According to an aspect of an exemplary embodiment, there is provided a method of controlling a stereo convergence that includes detecting objects from a stereo image comprising a left eye image and a right eye image; grouping the detected objects into at least one object group according to setup specification information; and moving at least one of the left eye image and the right eye image of the stereo image of the object group or a setup area comprising the object group in a horizontal or vertical direction, or in both the horizontal and vertical directions.

The method may further include correcting a distorted image after moving the stereo image.

The detecting the objects may comprise detecting objects which are included in common in the left eye image and the right eye image of the stereo image.

The objects may be grouped into at least one or more object groups based on distances between an imaging surface of a camera, and the detected objects.

The distances between the imaging surface of the camera and the detected objects may be calculated based on disparity vectors (DVs) of feature points (FPs) of the detected objects.

The setup area comprises grouping of detected objects corresponding to at least one of a particular distance, a particular character, and a particular background, the at least one of the particular distance, the particular character, and the particular background being selected through a user interface.

At least one of the left eye image and the right eye image of the stereo image may be moved in the horizontal or vertical direction, or in the horizontal and vertical directions, based on a distribution of disparity vectors (DVs) of the object group or the setup area comprising the object group.

The moving of the stereo image may comprise determining an area of interest comprising the object group; extracting feature points (FPs) from the area of interest; calculating disparity vectors (DVs) by matching portions of the left eye image and the right eye image corresponding to the extracted FPs; and moving at least one of the left eye image and the right eye image of the stereo image of the object group or a setup area comprising the object group in the horizontal or vertical direction, or in the horizontal and vertical directions, according to the distribution of the calculated DVs.

The moving of the stereo image may comprise generating disparity vectors (DVs) of the object group or the setup area comprising the object group; determining a convergence adjustment value based on the generated DVs; and moving the left eye image in the horizontal or vertical direction, or in the horizontal and vertical directions, and moving the right eye image in a direction opposite to a movement direction of the left eye image, based on the determined convergence adjustment value.

The determining of the convergence adjustment value may comprise calculating a histogram illustrating a disparity vector (DV) and frequency by using the generated DVs; and calculating the convergence adjustment value for matching a distribution of the DVs of the calculated histogram with an initially set target distribution.

According to another aspect of an exemplary embodiment, there is provided an image processor that comprises a convergence adjustment area detector which groups objects detected from a stereo image comprising a left eye image and a right eye image into at least one or more object groups according to setup specification information, and detects the object group or a setup area comprising the object group; and a convergence adjuster which moves at least one of the left eye image and the right eye image of the stereo image in a horizontal or vertical direction, or in both the horizontal and vertical directions, to adjust a convergence.

The convergence adjustment area detector may comprise an object detector which detects the objects from the stereo image; an object classifier which classifies the detected objects into the plurality of object groups based on distances between an imaging surface of a camera and the detected objects; and a convergence adjustment area determiner which selects at least one object group from the plurality of object groups, based on an initially set threshold distance and detects the selected object group or a setup area comprising the selected object group.

The convergence adjuster may comprise a feature extractor which extracts feature points (FPs) of the at least one object group or the setup area comprising the at least one object group from the left eye image or the right eye image of the stereo image; a disparity vector (DV) calculator which calculates disparity vectors (DVs) by matching portions of the left eye image and the right eye image corresponding to the extracted FPs; and a convergence controller which moves at least one of the left eye image and the right eye image of the stereo image of the object group or a setup area comprising the object group in the horizontal or vertical direction, or in the horizontal and vertical directions, based on the calculated DVs.

The convergence controller may comprise a histogram generator which calculates a histogram illustrating a disparity vector (DV) and frequency by using the calculated disparity vectors (DVs); a convergence adjustment value calculator which calculates an image movement value in a horizontal or vertical direction, or in both the horizontal and vertical directions, of the left eye image or the right eye image for matching a distribution of DVs of the calculated histogram with a target distribution; and an image mover which moves at least one of the left eye image and the right eye image in the horizontal or vertical direction, or in the horizontal and vertical directions, according to the image movement value.

The convergence adjuster may move at least one of the left eye image and the right eye image in the horizontal or vertical direction, or in the horizontal and vertical directions, based on the calculated DVs.

According to another aspect of an exemplary embodiment, there is provided method of controlling a stereo convergence, the method comprising detecting one or more objects in a left eye image of a stereo image, and one or more objects in a right eye image of the stereo image; grouping the detected objects into a plurality of object groups according to specification information and characteristics of the objects, each of the object groups comprising one object from the left eye image and one object from the right eye image; selecting one of the object groups from among the plurality of object groups; determining feature points (FPs) of the objects in the selected object group; determining disparity vectors (DVs) with respect to the FPs; and moving the left eye image with respect to the right eye image in order to adjust the DVs of the selected object

BRIEF DESCRIPTION OF THE DRAWINGS

Exemplary embodiments will be more clearly understood from the following detailed description taken in conjunction with the accompanying drawings in which.

DETAILED DESCRIPTION

Figure 1:
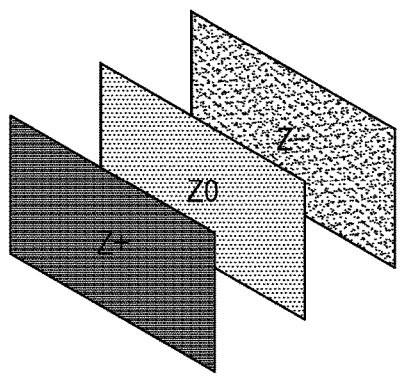
FIG. 1 is a view illustrating a disparity in a stereo image processor according to an exemplary embodiment.
Figure 1:
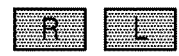
Figure 1:
Figure 1:
Figure 1:
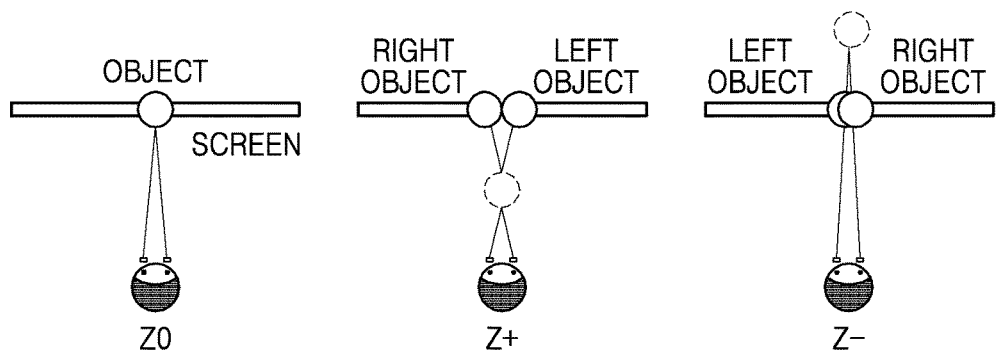

Exemplary embodiments will now be described more fully with reference to the accompanying drawings, in which the exemplary embodiments are shown. The inventive concept may, however, be embodied in many different forms and should not be construed as being limited to the exemplary embodiments set forth herein; rather, these exemplary embodiments are provided so that this disclosure will be thorough and complete, and will fully convey the inventive concept. The drawings are not necessarily to scale and, in the drawings, the thicknesses of layers and regions are exaggerated for clarity. Like reference numerals in the drawings denote like elements, and thus their description will be omitted.

The terminology used herein is for the purpose of describing particular exemplary embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that the terms, such as those defined in commonly used dictionaries, should be interpreted as having meanings consistent with their meanings in the context of the relevant art and will not be interpreted in an idealized or overly formal sense unless expressly so defined herein.

FIG. 1 is a view illustrating a disparity in a stereo image processor according to an exemplary embodiment.

In the present disclosure, an object refers to an element of a 3-dimensional (3D) image displayed on a display apparatus. The object may also include a left object that a left eye of a user sees and a right object that a right eye of the user sees.

In the present disclosure, a disparity refers to a distance between a left object L and a right object R. The disparity may be classified into a crossed disparity Z+, a zero disparity Z0, and an uncrossed disparity Z−. A reference surface that is used as a criterion for classifying the disparities as described above may be referred to as a screen of the display apparatus.

If a disparity value of an object corresponds to the zero disparity, the user may recognize that the object is positioned on the screen. If the disparity value of the object corresponds to the crossed disparity, the user may recognize that the object is positioned in front of the screen. If the disparity value of the object corresponds to the uncrossed disparity, the user may recognize that the object is positioned in the rear of the screen.

The disparity value of the object may be changed by convergence adjustment. According to an exemplary embodiment, the convergence adjustment may be performed by a method of moving a position of a left object or right object in a horizontal or vertical direction, or in the horizontal and vertical directions.

The inventive concept provides a method of grouping a plurality of objects included in a stereo image to be displayed on the display apparatus into one or more object groups based on setup specifications and adjusting the convergence based on the object group, or a setup area including the object group. The setup specifications may be set according to the preferences of a user.

Figure 2:
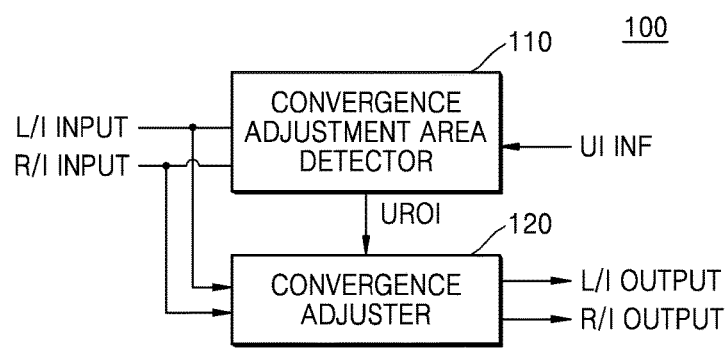
FIG. 2 is a block diagram illustrating a structure of a stereo image processor according to an exemplary embodiment.

FIG. 2 is a block diagram illustrating a structure of a stereo image processor according to an exemplary embodiment.

Referring to FIG. 2, a stereo image processor 100 includes a convergence adjustment area detector 110 and a convergence adjuster 120.

The convergence adjustment area detector 110 groups objects included in a stereo image into at least one or more object groups according to setup specification information UI INF and detects object group area, e.g. a location of a object group, or a setup area including the object group as a convergence adjustment area UROI. For example, the setup specification information UI INF may include information for designating at least one of a distance, a particular character, and particular backgrounds. For example, the distance, the particular character, and/or the particular background may be set by the user as part of the setup specification information UI INF. As another example, the setup specification information UI INF may be a default value in a system including the stereo image processor 100.

For example, the convergence adjustment area detector 110 receive an input of a left eye image (L/I Input) and an input of a right eye image (R/I Input) constituting a stereo image and may detect objects respectively from the left eye image and the right eye image and a object group area, or a setup area including the object group area from the detected objects based on the setup specification information UI INF. The setup area may be set by the user.

As another example, the convergence adjustment area detector 110 may detect objects respectively from the left eye image and the right eye image constituting the stereo image and group objects commonly detected from the left eye image and the right eye image into at least one object group matching the setup specification information UI INF in order to detect the setup area UROI.

As another example, the convergence adjustment area detector 110 may detect objects from one of the left eye image and the right eye image constituting the stereo image, and group the detected objects into at least one object group matching the setup specification information UI INF to detect the convergence adjustment area UROI.

For example, the convergence adjustment area detector 110 may group a plurality of objects detected from the stereo image into at least one or more object groups included in a particular distance range corresponding to the setup specification information UI INF to detect the convergence adjustment area UROI. An object distance may be defined as a distance between an imaging surface of a camera, and the object. The object distance may be calculated based on a characteristic of the object.

A distance range indicates that distances between the imaging surface of the camera and the objects are classified into a plurality of ranges. For example, the distances between the imaging surface of the camera and the objects may be classified into relative distances. In other words, the object distances may be classified, for example, into a short distance range, a middle distance range, and a long distance range and grouped into one or more object groups included in one of the short distance range, the middle distance range, and the long distance range based on the setup specification information UI INF to detect the convergence adjustment area RUOI.

As another example, the convergence adjustment area detector 110 may group a plurality of objects detected from the stereo image into face shape objects included in a particular distance range corresponding to the setup specification information UI INF to detect the convergence adjustment area RUOI.

The convergence adjuster 120 receives as an input the left eye image (L/I Input) and the right eye image (R/I Input), and performs signal processing to move at least one of the left eye image and the right eye image of the stereo image in the horizontal or vertical direction, or in the horizontal and vertical directions, so that a target convergence point is positioned in a object group including at least one object detected by the convergence adjustment area detector 110, or a setup area including the object group. Therefore, the convergence adjuster 120 generates the left eye image signal (L/I Output) and a right eye image signal (R/I Output) that have been moved.

For example, the convergence adjuster 120 performs signal processing to match main objects of the left eye image and the right eye image that are input to calculate disparity vectors, and to move the left eye image or the right eye image in the horizontal or vertical direction, or in the horizontal and vertical directions, to match a distribution of the calculated disparity vectors with an initially set target distribution.

The convergence adjuster 120 performs signal processing to move the left eye image in the horizontal or vertical direction, or in the horizontal and vertical directions, and to move the right eye image in a direction opposite to a direction in which the left eye image is moved, so that the distribution of the calculated disparity vectors matches with the initially set target distribution. Alternatively, the convergence adjuster 120 may perform signal processing to move the right eye image in the horizontal or vertical direction, or in the horizontal and vertical directions, and move the L/I Input in a direction opposite to the direction in which the R/I Input is moved.

Figure 3:
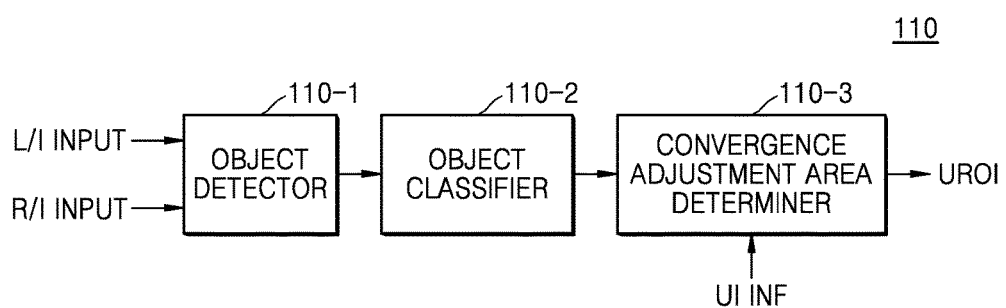
FIG. 3 is a block diagram illustrating a detailed structure of a convergence adjustment area detector of FIG. 2 according to an exemplary embodiment.

FIG. 3 is a block diagram illustrating a detailed structure of the convergence adjustment area detector of FIG. 2, according to an exemplary embodiment.

Referring to FIG. 3, the convergence adjustment area detector 110 includes an object detector 110-1, an object classifier 110-2, and a convergence adjustment area determiner 110-3.

The object detector 110-1 performs an operation of detecting objects from a stereo image. For example, the object detector 110-1 may receive an input of a left eye image (L/I Input) and an input of a right eye image (R/I Input) constituting the stereo image, and detect objects respectively from the left eye image and the right eye image. As another example, the object detector 110-1 may detect objects from one of the left eye image and the right eye image constituting the stereo image. For example, the object detector 110-1 may perform the operation of detecting objects from the left eye image or the right eye image by using a Speeded Up Robust Features (SURF) algorithm, a Scale Invariant Feature Transform (SIFT) algorithm, a face detection algorithm, or the like.

Figure 9A:
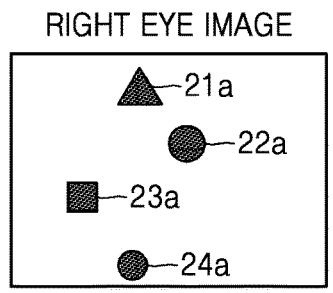
FIG. 9A is a view illustrating a right eye image of which convergence is not adjusted in a stereo image processor, according to an exemplary embodiment.
Figure 9B:
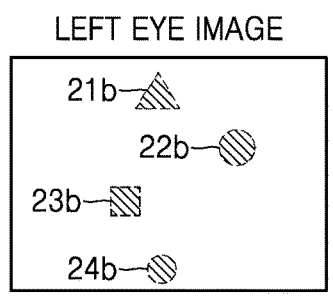
FIG. 9B is a view illustrating a left eye image of which convergence is not adjusted in a stereo image processor, according to an exemplary embodiment.

For example, objects detected from the right eye image that is input to the object detector 110-1 are illustrated in FIG. 9A, and objects detected from the left eye image that is input to the object detector 110-1 are illustrated in FIG. 9B. Objects 21a, 22a, 23a, and 24a detected from the right eye image respectively correspond to objects 21b, 22b, 23b, and 24b detected from the left eye image. For convenience of description, the objects are illustrated as, from the topmost object, triangular, large circular, square, and small circular objects, in each of FIGS. 9A and 9B. However, objects of a real image are not limited to these shapes, and may have various types of shapes such as characters, objects, various background screens, etc.

With reference to FIGS. 9A and 9B, the objects 21a, 22a, 23a, 24a, 21b, 22b, 23b, and 24b may be grouped into a plurality of object groups. For example, the object 21a and the object 21b may form an object group, the object 22a and the object 22b may form an object group, and so on. In this case, the objects are grouped into pairs based on their similarity in the left eye image and the right eye image. That is, the portion of the right eye image corresponding to object 21a has similar characteristics to the portion of the left eye image corresponding to object 21b, and so on.

Figure 9C:
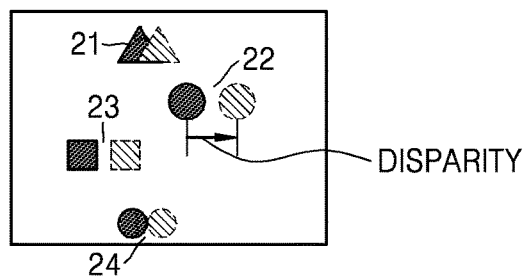
FIG. 9C is a view illustrating a disparity between left and right eye images of which convergences are not adjusted in a stereo image processor, according to an exemplary embodiment.

FIG. 9C illustrates an example of the right eye image and the left eye image of FIGS. 9A and 9B that are overlapped with each other. That is, the right eye image of FIG. 9A is overlapped with the left eye image of FIG. 9B. When the right eye image and the left eye image are overlapped in this manner, and objects of the left eye image are positioned on the right side of objects of the right eye image, a disparity has a positive component, i.e. a crossed disparity (See also FIG. 1). Thus, all objects illustrated in FIG. 9C have positive disparity.

If a stereo image as shown in FIG. 9C is displayed on a 3D display, all objects of the stereo image look as if they are out of (i.e., in front of) a screen. If a disparity having a positive component is too large, the user suffers from eye fatigue.

The object classifier 110-2 classifies objects into a plurality of object groups based on distances between an imaging surface of a camera and the detected objects. The distances between the imaging surface of the camera and the objects may be calculated based on characteristics of the objects. For example, a distance of a face shape object may be calculated based on a distance between two eyes. As another example, a distance of each object may be calculated based on a disparity between a left eye image and a right eye image. As another example, the distance of each object may be calculated by using a distance measurement sensor.

Also, the object classifier 110-2 may classify objects into a short distance group, a middle distance group, and a long distance group according to distances of objects. The short distance, the middle distance, and the long distance may be set by a user, or may be set experimentally. While three groups are described here, the object classifier 110-2 may alternatively classify the objects into two groups, or into four or more groups according to the distances of the objects. That is, the specific number of groups is not particularly limited.

The convergence adjustment area determiner 110-3 selects one or more object groups from among the plurality of object groups based on a particular distance, a particular character, and/or a particular background, in order to determine the selected object group or the convergence adjustment area UROI including the selected object group. The particular distance, the particular character, and/or the particular background may be set by the user, and an initial value may be provided by the user. For example, the particular distance may be set initially as a range of distances corresponding to the short distance group and middle distance group, in which case the short distance group and the middle distance group would be selected. Alternatively, the distance may be set initially as a specific distance value, in which case the distance group including the specific distance value would be selected. The particular character and the particular background may be set in a similar manner, and thus will not be described here.

For example, the distance may be initially set by the setup specification information UI INF. As another example, the distance and shape characteristic information for grouping objects may be set by the setup specification information UI INF. The distance and/or the shape characteristic information may be pre-set by the user.

For example, if a distance set by the setup specification information UI INF belongs to a middle distance group, objects classified into the middle distance group may be grouped to determine the convergence adjustment area UROI.

As another example, if a distance and a shape characteristic set by the setup specification information UI INF indicate a face-shaped object belonging to the middle distance group, objects having face shapes among objects classified into the middle distance group may be grouped to determine the convergence adjustment area UROI.

Figure 4:
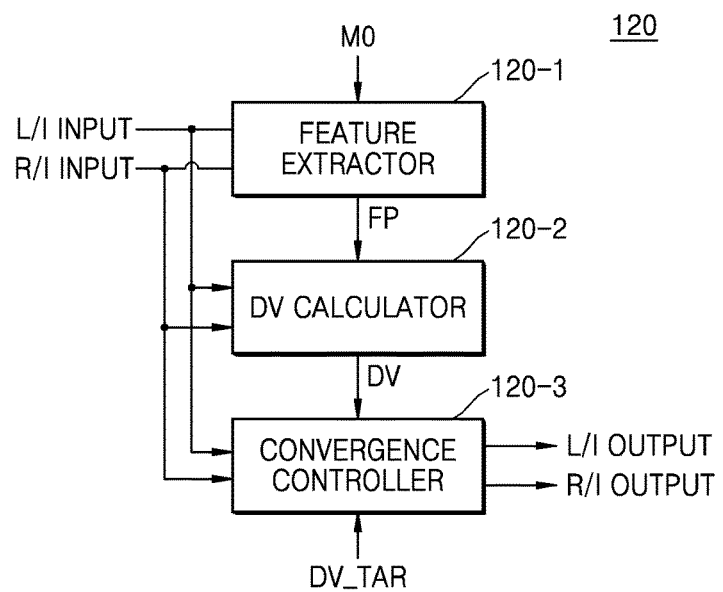
FIG. 4 is a block diagram illustrating a detailed structure of a convergence adjuster of FIG. 2 according to an exemplary embodiment.

FIG. 4 is a block diagram illustrating a detailed structure of the convergence adjuster of FIG. 2, according to an exemplary embodiment.

Referring to FIG. 4, the convergence adjuster 120 includes a feature extractor 120-1, a disparity vector (DV) calculator 120-2, and a convergence controller 120-3.

The feature extractor 120-1 performs an operation of extracting feature points (FPs) of an object group or a setup area including the object group from a left eye image or a right eye image constituting a stereo image. For example, the feature extractor 120-1 may determine arbitrary pixels of pixels of the object group or the setup area including the object group, as the FPs. For example, the feature extractor 120-1 may extract pixels appropriate for matching grouped objects, as FPs, from the left eye image and the right eye image.

For example, the feature extractor 120-1 may extract pixels corresponding to a boundary line or an edge of a grouped object as FPs. In detail, the feature extractor 120-1 may calculate X and Y gradients of pixels of a grouped object and extract pixels having X and Y gradients greater than or equal to a threshold value as FPs.

The disparity vector calculator 120-2 performs an operation of calculating disparity vectors DVs by matching left and right eye images with respect to FPs of a grouped object. For example, if FPs are extracted from the left eye image, the disparity vector calculator 120-2 may search the right eye image for points corresponding to the FPs of the left image. The disparity vector calculator 120-2 searches an area of interest of the right eye image corresponding to the FPs of the left eye image, for points corresponding to the FPs of the left eye image. This is effective in reducing search time.

According to the same method, if FPs are extracted from a right eye image, points corresponding to the FPs of the right eye image are searched for in the left eye image. An area of interest of the left eye image corresponding to the FPs of the right eye image is searched to identify points corresponding to the FPs of the right eye image. This is effective in reducing search time.

A method of matching FPs may be performed by using a Sum of Absolute Difference (SAD), Mean of Absolute Difference (MAD), Sum of Squared Difference (SSD), or Zero Normalized Cross Correlation (ZNCC) algorithm or the like.

The DV calculator 120-2 matches FPs of the grouped object and then calculates DVs of the FPs.

As another example, the DV calculator 120-2 may determine an area of interest including a grouped object, extract FPs from the determined area of interest, match left and right eye images with respect to the extracted FPs, and calculate DVs of the FPs.

The convergence controller 120-3 performs an operation of moving at least one of the left and right eye images constituting the stereo image in a horizontal or vertical direction, or in the horizontal and vertical directions, to adjust convergence based on the calculated DVs. For example, to match a distribution of the DVs with a target DV value DV_TAR of an initially set target distribution, the convergence controller 120-3 may move at least one of the left eye image and the right eye image in the horizontal or vertical direction, or in the horizontal and vertical directions to adjust convergence. This movement will be described further below with reference to FIGS. 10A-10C.

For example, to match the distribution of the DVs with the target DV value DV_TAR of the initially set target distribution, the convergence controller 120-3 may move at least one of the left eye image and the right eye image of a stereo image of a grouped object or a setup area including the grouped object in the horizontal or vertical direction, or in the horizontal and vertical directions, to adjust convergence.

As another example, to match the distribution of the DVs with the target DV value DV_TART of the initially set target distribution, the convergence controller 120-3 may move at least one of the left eye image and the right eye image of a stereo image of a whole area of a screen in the horizontal or vertical direction, or in the horizontal and vertical directions, to adjust convergence.

For example, the convergence controller 120-3 may move at least one of the left eye image and the right eye image of a stereo image of an object grouped according to the setup specification information UI INF or a setup area including the grouped object in the horizontal or vertical direction, or in the horizontal and vertical directions, or may move at least one of the left eye image and the right eye image of the stereo image of a whole area of one screen in the horizontal or vertical direction, or in the horizontal and vertical directions.

Figure 5:
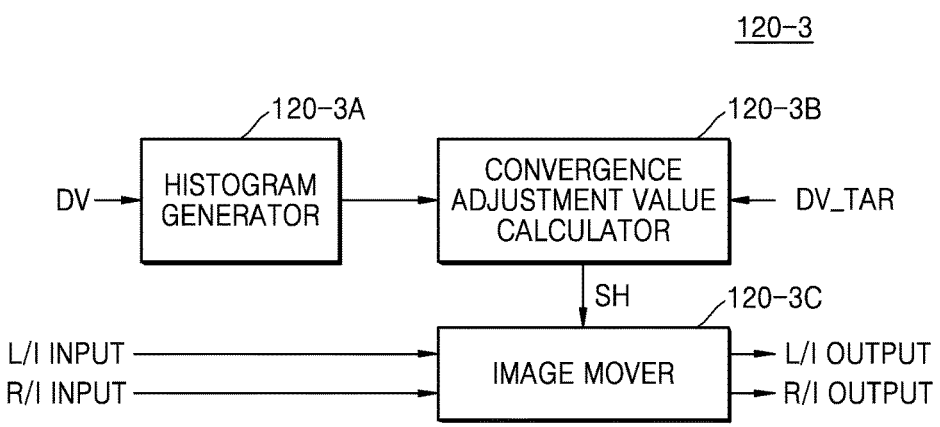
FIG. 5 is a block diagram illustrating a detailed structure of a convergence controller according to an exemplary embodiment.

FIG. 5 is a block diagram illustrating a detailed structure of a convergence controller of FIG. 4, according to an exemplary embodiment.

Referring to FIG. 5, the convergence controller 120-3 includes a histogram generator 120-3A, a convergence adjustment value calculator 120-3B, and an image mover 120-3C.

The histogram generator 120-3A calculates a histogram illustrating the frequency of DVs calculated respectively with respect to FPs of a grouped object.

Figure 11:
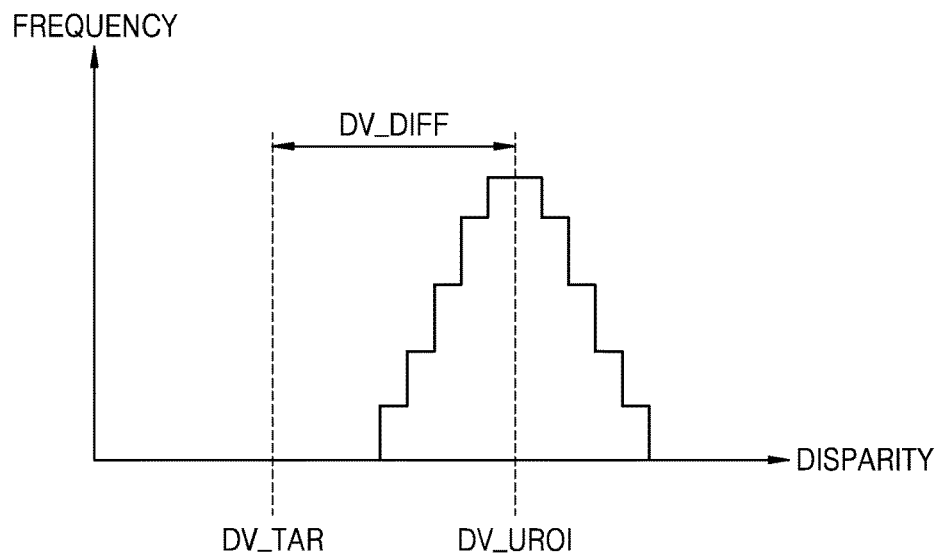
FIG. 11 is a histogram illustrating a disparity vector value and frequency in a main object according to the inventive concept.

For example, the object 24a of FIG. 9A, the object 24b of FIG. 9B, or the object 24 of FIG. 9C is assumed to be a grouped object. A histogram calculated in an area including the grouped object 24a or 24b is as shown in FIG. 11.

The convergence adjustment value calculator 120-3B calculates an image movement value SH in a horizontal or vertical direction, or in the horizontal and vertical directions of a left eye image or right eye image for matching a distribution of DV values of the calculated histogram with an initially set target distribution. The movement value SH may be defined as a convergence adjustment value. For example, with reference to FIGS. 5 and 11, the convergence adjustment value calculator 120-3B may calculate the movement value SH based on a difference DV_DIFF between an average value DV_UROI of DVs of the histogram and the target DV value DV_TAR of the initially set target distribution.

For example, the convergence adjustment value calculator 120-3B may calculate the image movement value SH corresponding to the difference DV-DIFF between the average value DV_UROI of the DV values of the histogram and the target DV value DV_TAR of the initially set target distribution, by using a lookup table (LUT) that shows changes of a disparity value with respect to the image movement value SH.

As another example, the convergence adjustment value calculator 120-3B may calculate the image movement value SH corresponding to the difference DV-DIFF between the average value DV_UROI of the DV values of the histogram and the target DV value DV_TAR of the initially set target distribution, by using a function that defines the image movement value SH according to changes of a disparity value.

Referring to FIG. 11, the convergence adjustment value calculator 120-3B may calculate the image movement value SH in the horizontal or vertical direction, or in the horizontal and vertical directions, for adjusting the average value DV_UROI of DV values of a histogram calculated from a grouped object by the difference DV_DIFF in a negative direction.

The image mover 120-3C performs an operation of moving at least one of the left eye image and the right eye image of a stereo image of an object grouped according to a calculated image movement value or a setup area including the grouped object in the horizontal or vertical direction, or in the horizontal and vertical directions.

As another example, the image mover 120-3C may also perform an operation of moving at least one of the left eye image and the right eye image of a stereo image of a whole area of one screen in the horizontal or vertical direction, or in the horizontal and vertical directions, according to the calculated image movement value.

In detail, the image mover 120-3C may perform an operation of moving the left eye image in the horizontal or vertical direction, or in the horizontal and vertical directions, according to the image movement value, and moving the right eye image in a direction opposite to a movement direction of the left image.

For example, referring to FIG. 11, the image mover 120-3C may fix the right eye image and move the left eye image by the image movement value SH in the horizontal or vertical direction, or in the horizontal and vertical directions, to adjust a disparity by the difference DV_DIFF in a negative direction. Alternatively, or additionally, the image mover 120-3C may fix the left eye image and move the right eye image by the image movement value SH in the horizontal or vertical direction, or in the horizontal and vertical directions, to adjust the disparity by the difference DV_DIFF in the negative direction.

As another example, the image mover 120-3C may move the left eye image by SH/2 in the horizontal or vertical direction, or in the horizontal and vertical directions, and move the right eye image by SH/2 in the horizontal or vertical direction, or in the horizontal and vertical directions opposite to the movement direction of the left eye image.

Figure 10A:
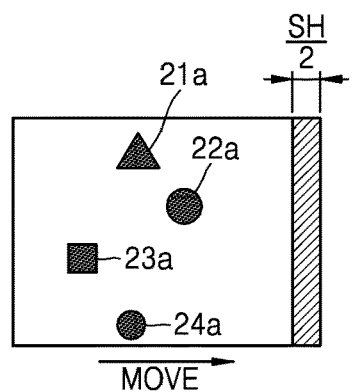
FIG. 10A is a view illustrating a right eye image of which convergence is adjusted in a stereo image processor, according to an exemplary embodiment.
Figure 10B:
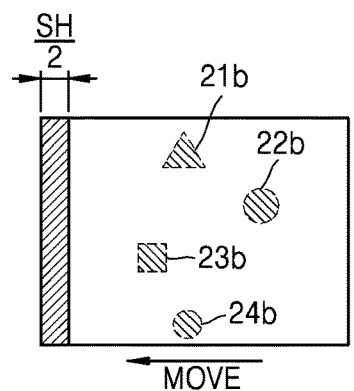
FIG. 10B is a view illustrating a left eye image of which convergence is adjusted in a stereo image processor, according to an exemplary embodiment.

FIG. 10A illustrates a result of moving a right eye image of FIG. 9A by SH/2 to the right, and FIG. 10B illustrates a result of moving a left eye image of FIG. 9B by SH/2 to the left.

Figure 10C:
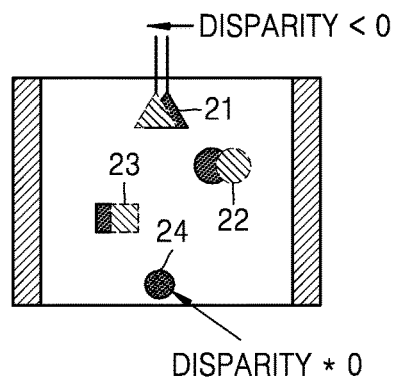
FIG. 10C is a view illustrating a disparity between left and right eye images of which convergences are adjusted in a stereo image processor, according to an exemplary embodiment.

FIG. 10C illustrates an example of a left eye image and a right eye image, of which convergence is adjusted according to a whole screen movement and thus overlap with each other. As described above, when the left eye image and the right eye image are overlapped with each and the left objects are positioned on the right side of right objects, a disparity has a positive component. For example, as shown in FIG. 10C, a disparity of a main object 24 has a value of 0, a disparity of an object 21 has a negative value, and disparities of object 22 and object 23 have positive values. Therefore, the main object 24 is recognized as being positioned on a screen surface of a display, the object 21 is recognized as being positioned in the rear of a screen, and the object 22 and the object 23 are recognized as being respectively positioned in front of the screen.

Therefore, a stereo image of FIG. 10C, of which convergence is adjusted, provides a user with various disparities in comparison with a stereo image of FIG. 9C. That is, in FIG. 9C, before movement, all the disparities are positive. By contrast, in FIG. 10C, after movement, there are a range of different disparities among no disparity, positive disparity, and negative disparity. Having a range of disparities reduces the eye fatigue of the user. Also, the user may stably feel a variety of 3D effects.

If a disparity is adjusted by the difference DV_DIFF in a positive direction, the image mover 120-3C may fix the right eye image and move the left eye image toward the right by the image movement value SH in the horizontal or vertical direction, or in the horizontal and vertical directions. Alternatively, if the disparity is adjusted by the difference DV_DIFF in the positive direction, the image mover 120-3C may fix the left eye image and move the right eye image toward the left by the image movement value SH in the horizontal or vertical direction, or in the horizontal and vertical directions. Alternatively, the image mover 120-3C may also move the left eye image by SH/2 toward the right in the horizontal or vertical direction, or in the horizontal and vertical directions, and move the right eye image by SH/2 in the horizontal or vertical direction, or in the horizontal and vertical directions, in a direction opposite to a movement direction of the left eye image, to adjust the disparity by the difference DV_DIFF in the positive direction.

FIGS. 10A, 10B, and 10C illustrate an example of controlling convergence by using a method of moving at least one of the left eye image and the right eye image of a stereo image of a whole area of one screen.

In another exemplary embodiment, an operation of moving at least one of the left eye image and the right eye image of a stereo image of a grouped object or a setup area including the grouped object may be performed.

Figure 6:
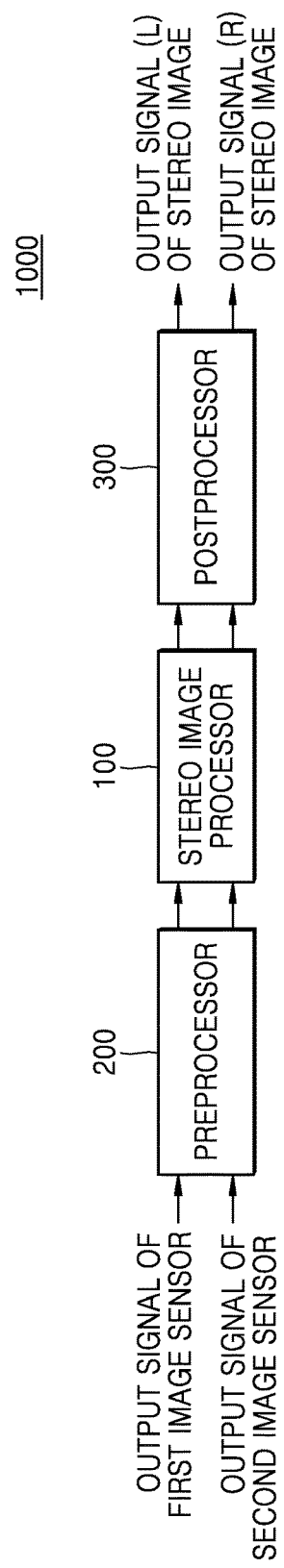
FIG. 6 is a block diagram illustrating a structure of an image processor according to an exemplary embodiment.

FIG. 6 is a block diagram illustrating an image processor according to an exemplary embodiment.

Referring to FIG. 6, an image processor 1000 includes a preprocessor 200, a stereo image processor 100, and a postprocessor 300.

The stereo image processor 100 has been described in detail with reference to FIGS. 2 through 5.

Image signals that are respectively sensed by a plurality of image sensors for realizing a 3D image are applied to the preprocessor 200.

For example, an output signal of a first image sensor 1100A of an image sensor 1100 of an electronic device 10000 of FIG. 7 (which will be described in detail below) and an output signal of a second image sensor 1100B of the image sensor 1100 may be input into the preprocessor 200.

The preprocessor 200 may perform signal processing, such as format conversion, auto white balance (AWB), auto focus (AF), auto exposure (AE), correction processing, etc., with respect to image signals input from image sensors. For example, the correction processing may include processing for correcting horizontal axis distortion of an image, etc.

Signals generated by the stereo image processor 100 are input into the postprocessor 300. The postprocessor 300 scales the input signals, moves a stereo image, and corrects a distorted image. The postprocessor 300 scales an image down or up based on an image movement performed by a stereo convergence control of the stereo image processor 100.

For example, if an image movement is performed according to a stereo convergence control as shown in FIGS. 10A, 10B, and 10C, the postprocessor 300 respectively cuts a right slashed part of the right eye image of FIG. 10A (for example, a distance of SH/2 in a horizontal direction) and a left slashed part of the left eye image of FIG. 10B (for example, a distance of SH/2 in a horizontal direction) and then respectively scales the left eye image and the right eye image up at a up-scaling ratio based on a cut length.

The postprocessor 300 generates a stereo image output signal L and a stereo image output signal R that have been scaled as described above.

Figure 7:
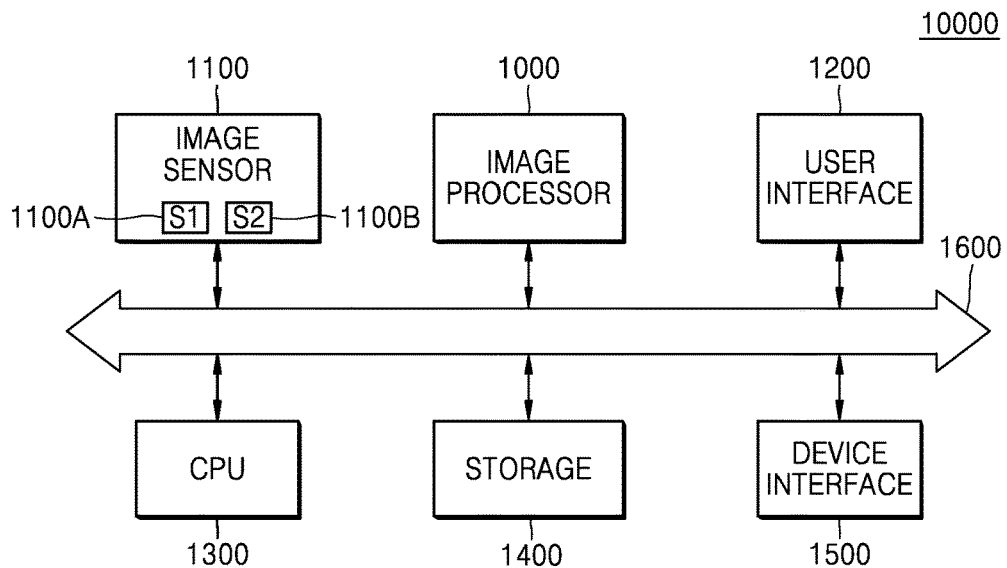
FIG. 7 is a block diagram illustrating a structure of an electronic apparatus using a stereo image processor according to an exemplary embodiment.

FIG. 7 is a block diagram illustrating a structure of an electronic device using an image processor, according to an exemplary embodiment.

Referring to FIG. 7, an electronic device 10000 includes an image processor 1000, an image sensor 1100, a user interface 1200, a central processing unit (CPU) 1300, a storage 1400, a device interface 1500, and a bus 1600.

The image processor 1000 has been described in detail above with reference to FIG. 6. Referring to FIG. 6, the image processor may include the stereo image processor 100 shown in FIG. 1.

The image sensor 1100 includes two image sensors 1100A and 1100B to realize a 3D image. As another exemplary embodiment, the image sensor 1100 may include three or more image sensors. The two image sensors 1100A and 1100B respectively acquire images through a device such as a camera.

The user interface 1200 is an input device through which information used for setting a function of the electronic device 10000 and performing an operation of the electronic device 10000 may be set. For example the information may be set by a user.

For example, the setup specification information UI INF used for detecting a main object in the image processor 1000 may be set by using the user interface 1200. Also, the target DV value DV_TAR used for convergence control may be changed using the user interface 1200. Alternatively, a main object of the stereo image may be selected by the user using the user interface 1200.

The CPU 1300 controls an overall operation of the electronic device 10000. For example, the CPU 1300 may control elements to allow the electronic device 10000 to perform a function set through the user interface 1200.

The storage 1400 stores various types of information used for the operation of the electronic device 10000. For example, the storage 1400 may store the setup specification information UI INF and the target DV value DV_TAR used for a stereo convergence control operation in the image processor 1000. The storage 1400 may also store image data processed by the image processor 1000.

The storage 1400 may be implemented as a memory device such as a RAM or a flash memory device. Partial or whole elements of the electronic device 10000 may be designed as a system on chip (SOC). For example, a circuit including the storage 1400 and the image processor 1000 may be designed to be included in the SOC.

The device interface 1500 performs data communication with an apparatus that is connected to the electronic device 10000 by wire or wireless. For example, the device interface 1500 may be connected to a display apparatus to perform an operation of transmitting a signal output from the image processor 1000 to the display apparatus.

The bus 1600 performs a function of transmitting information between the elements of the electronic device 10000.

Figure 8:
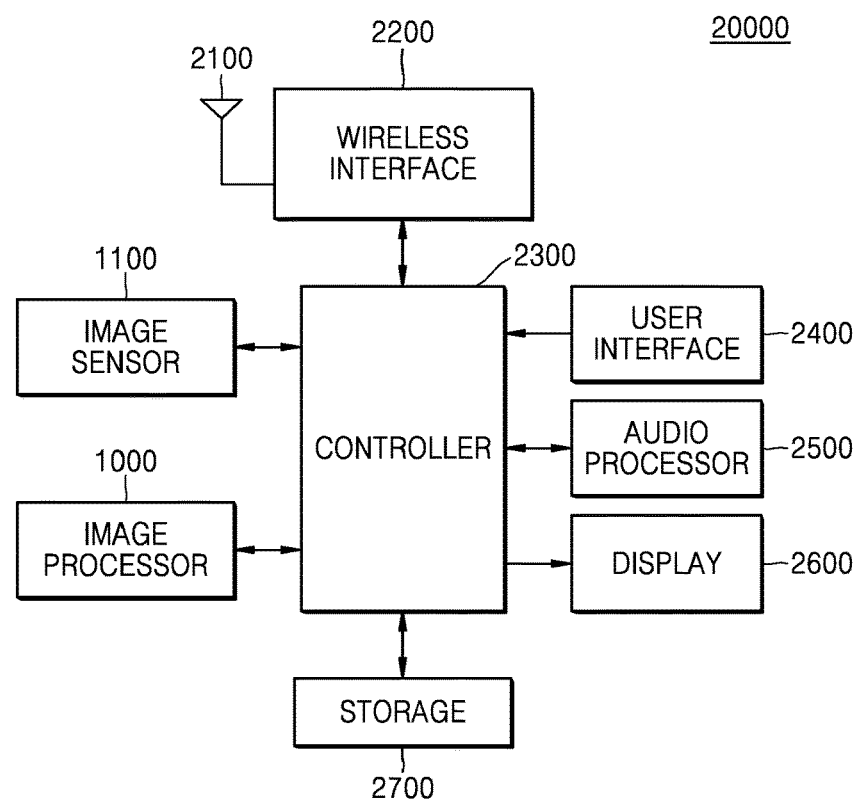
FIG. 8 is a block diagram illustrating a structure of a mobile terminal using a stereo image processor according to an exemplary embodiment.

FIG. 8 is a block diagram illustrating a structure of a mobile terminal, according to an exemplary embodiment.

Referring to FIG. 8, a mobile device 20000 includes the image processor 1000, the image sensor 1100, an antenna 2100, a wireless interface 2200, a controller 2300, a user interface 2400, an audio processor 2500, a display 2600, and a storage 2700.

The image processor 1000 and the image sensor 1100 have been described in detail with reference to FIG. 6. Referring to FIG. 6, the image processor 1000 may include the stereo image processor 100 shown in FIG. 1.

The antenna 2100 emits or receives electromagnetic waves to wirelessly transmit or receive a signal.

The wireless interface 2200 performs signal processing for transmitting and receiving data through a wireless channel and the antenna 2100.

The controller 2300 controls an overall operation of the mobile device 20000. For example, the controller 2300 may control a signal flow between elements of the mobile device 20000 and processes data.

The user interface 2400 receives a control signal for controlling the mobile device 20000 and transmits the control signal to the controller 2300. The control signal may be input by a user. For example, the user interface 2400 may input information for setting the setup specification information UI INF used for detecting a main object in the image processor 1000 or the target DV value DV_TAR used for convergence control. Alternatively, the user interface 2400 may input information from the user for selecting a main object of the stereo image.

The audio processor 2500 may include a coder/decoder (codec), and the codec may include a data codec that processes packet data or the like and an audio codec that processes an audio signal of a voice or the like. The audio processor 2500 converts digital audio data, which is received through the wireless interface 2200, into an analog audio signal through the audio codec, outputs the analog audio signal through a speaker, converts an analog audio signal input from a microphone into digital audio data, and transmits the digital audio data to the controller 2300.

The display 2600 displays image data output from the controller 2300 on a screen. For example, the display 2600 may be a liquid crystal display (LCD) apparatus. For example, the display 2600 may receive stereo image data output from the image processor 1000 and display the stereo image data on the screen.

The storage 2700 stores various types of information necessary for an operation of the mobile device 20000. For example, the storage 2700 may store the setup specification information UI INF and the target DV value DV_TAR used for the stereo convergence control operation in the image processor 1000. The storage 2700 may also store image data processed by the image processor 1000.

A method of controlling a stereo convergence performed by the electronic device of FIG. 7 according to an exemplary embodiment will now be described.

Figure 12:
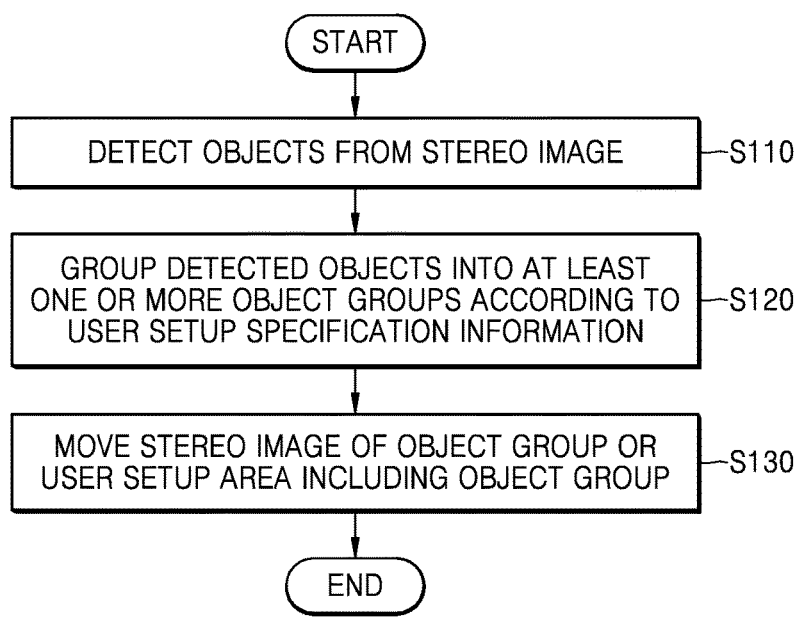
FIG. 12 is a flowchart illustrating a method of controlling stereo convergence according to an exemplary embodiment.

FIG. 12 is a flowchart illustrating a method of controlling a stereo convergence according to an exemplary embodiment.

Referring to FIG. 12, in operation 110, the image processor 1000 of the electronic device 10000 detects objects from an input stereo image. The stereo image may include left and right eye images that are respectively acquired by the two image sensors 1100A and 1100B of the image sensor 1100. For example, the image processor 1000 may detect objects respectively from a left eye image that is input (L/I Input) and a right eye image that is input (R/I Input) constituting a stereo image. As another example, the image processor 1000 may detect objects from at least one of the left eye image and the right eye image of the stereo image. For example, the image processor 1000 may detect the object from the left eye image or the right eye image by using an (Speeded Up Robust Features (SURF) or Scale Invariant Feature Transform (SIFT) algorithm, a face detection algorithm, or the like.

In operation S120, the image processor 1000 of the electronic device 10000 groups the detected objects into at least one or more object groups according to setup specification information UI INF. For example, the setup specification information UI INF may include information for designating at least one of a preferred distance, a particular character, and particular backgrounds. As another example, the setup specification information UI INF may be set to a default value in the electronic device 10000. The setup specification information UI INF is stored in the storage 1400.

In operation S130, the image processor 1000 of the electronic device 10000 moves a stereo image of an object group or a setup area including the object group.

For example, the image processor 1000 may perform a convergence control to move at least one of the left eye image and the right eye image of the stereo image of a grouped object or a setup area including the grouped object in a horizontal or vertical direction, or in the horizontal and vertical directions.

As another example, the image processor 1000 may perform a convergence control to move at least one of the left eye image and the right eye image of the stereo image of a whole area of one screen in a horizontal or vertical direction, or in the horizontal and vertical directions.

The image processor 1000 of the electronic device 10000 may additionally perform signal processing for correcting a distorted image after the stereo image is moved.

Figure 13:
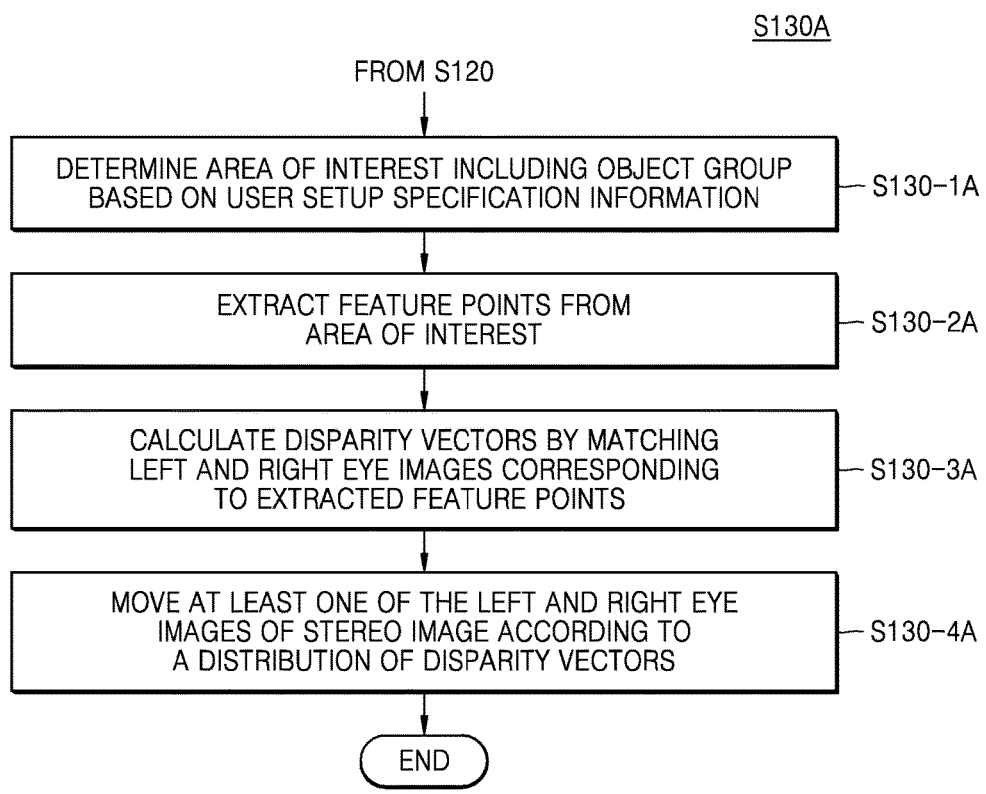
FIG. 13 is a detailed flowchart illustrating a stereo image moving operation of FIG. 12, according to an exemplary embodiment.

FIG. 13 is a detailed flowchart illustrating operation S130A of moving a stereo image as shown in FIG. 12, according to an exemplary embodiment.

Referring to FIG. 13, in operation S130-1A, the image processor 1000 of the electronic device 10000 determines an area of interest including an object group based on setup specification information. For example, the area of interest may be determined in various shapes such as a square shape, a circular shape, an elliptical shape, etc. including a grouped object.

In operation S130-2A, the image processor 1000 of the electronic device 10000 extracts FPs from the area of interest. For example, the image processor 1000 may extract pixels appropriate for matching the left eye image and the right eye image in the area of interest, as FPs.

In operation S130-3A, the image processor 1000 of the electronic device 10000 calculate disparity vectors (DVs) by matching the left eye image and the right eye image corresponding to the FPs extracted from the area of interest.

In operation S130-4A, the image processor 1000 of the electronic device 10000 moves at least one of the left eye image and the right eye image of the stereo image according to a distribution of DVs of a main object.

For example, the image processor 1000 may move at least one of the left eye image and the right eye image of the stereo image of a grouped object or a setup area including the grouped object in a horizontal or vertical direction, or in the horizontal and vertical directions, to match a distribution of DVs of a main object with a target DV DV_TAR of an initially set target distribution.

As another example, the image processor 1000 may move at least one of the left eye image and the right eye image of the stereo image of a whole area of one screen in the horizontal or vertical direction, or in the horizontal and vertical directions, to match the distribution of the DVs of the main object with the target DV DV_TAR of the initially set target distribution.

Figure 14:
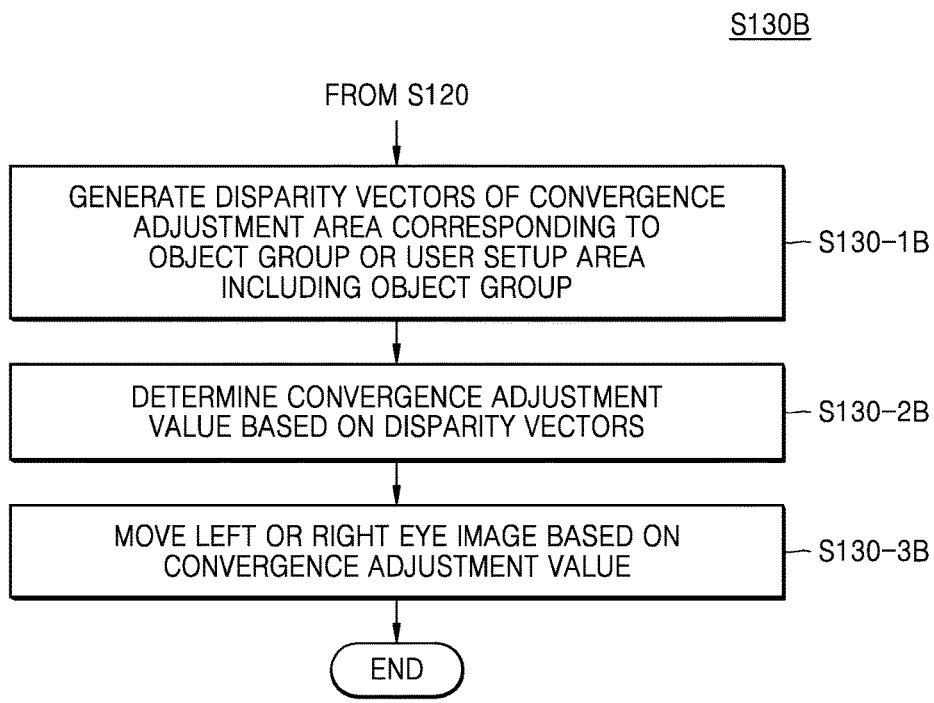
FIG. 14 is a detailed flowchart illustrating the stereo image moving operation of FIG. 12, according to another exemplary embodiment.

FIG. 14 is a detailed flowchart illustrating operation S130B of moving a stereo image as shown in FIG. 12, according to an exemplary embodiment.

In operation S130-1B, the image processor 1000 of the electronic device 10000 generates DVs of a convergence adjustment area UROI corresponding to an object group or a setup area including the object group. For example, the image processor 1000 may extract FPs of the convergence adjustment area UROI corresponding to the object group or the setup area including the object group, from the left eye image and the right eye image and match the left eye image and the right eye image based on the extracted FPs to calculate DVs of the setup area.

In operation S130-2B, the image processor 1000 of the electronic device 10000 determines a convergence adjustment value based on the calculated DVs. The image processor 1000 may determine the convergence adjustment value for matching a distribution of the DVs with a target DV of an initially set target distribution.

In operation S130-3B, the image processor 1000 of the electronic device 10000 moves the left eye image and the right eye image in the horizontal or vertical direction, or in the horizontal and vertical directions, based on the convergence adjustment value.

For example, the image processor 1000 may move at least one of the left eye image and the right eye image of the stereo image of a grouped object or a setup area including the grouped object, based on the convergence adjustment value in the horizontal or vertical direction, or in the horizontal and vertical directions.

As another example, the image processor 1000 may move at least one of the left eye image and the right eye image of a stereo image of a whole area of one screen in the horizontal or vertical direction, or in the horizontal and vertical directions, based on the convergence adjustment value.

Figure 15:
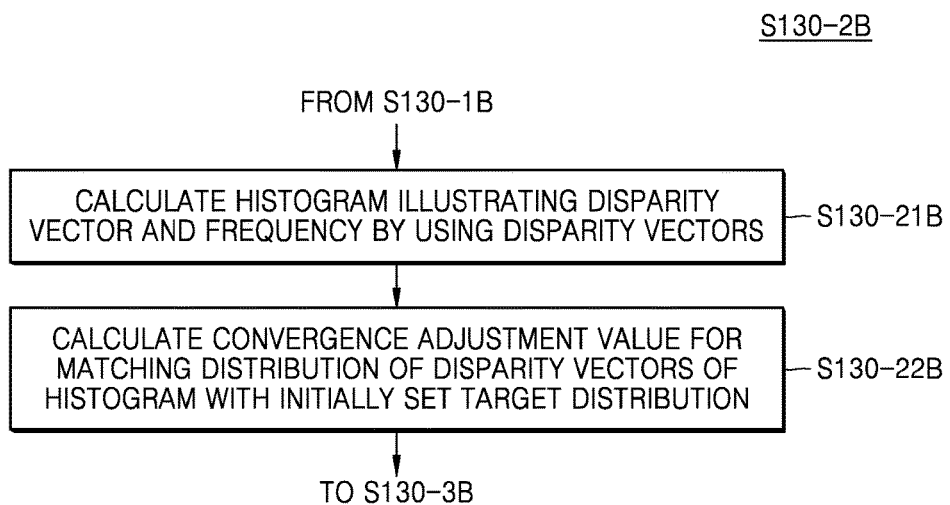
FIG. 15 is a detailed flowchart illustrating a convergence adjustment value determining operation of FIG. 14, according to an exemplary embodiment.

FIG. 15 is a detailed flowchart illustrating operation S130-2B of FIG. 14 of determining the convergence adjustment value, according to an exemplary embodiment.

In operation S130-21B, the image processor 1000 of the electronic device 10000 calculates a histogram illustrating a DV and the frequency by using the DVs calculated in operation S130-1B. For example, the image processor 1000 may calculate a histogram illustrating the frequency of DVs calculated respectively with respect to FPs of a grouped object or a setup area including the grouped object. An example of the calculated histogram is illustrated in FIG. 11.

In operation S130-22B, the image processor 1000 of the electronic device 10000 calculates a convergence adjustment value for matching a distribution of the DVs of the histogram with an initially set target distribution. For example, the image processor 1000 may calculate the convergence adjustment value based on a difference DV_DIFF between an average value DV-UROI of the DVs of the histogram and a target DV DV_TAR of the initially set distribution.

For example, the image processor 1000 may calculate an image movement value SH based on the difference DV_DIFF between the average value DV_UROI of the calculated DVs and the target DV DV_TAR of the initially set distribution. The image movement value SH may be defined as a convergence adjustment value.

For example, the image processor 1000 may calculate the image movement value SH of a horizontal or vertical direction, or the horizontal and vertical directions, corresponding to the difference DV_DIFF by using a LUT indicating changes of a DV according to an image movement value. As another example, the image processor 1000 may calculate the image movement value SH corresponding to the difference DV_DIFF by using a function defining an image movement value according to changes of a DV.

As described above, exemplary embodiments provide a stereo convergence control method of adjusting convergence by using a main object that is selected from a stereo image based on a desired specification.

As described above, exemplary embodiments also provide a stereo image processor that adjusts convergence by using a main object that is selected from a stereo image based on a desired specification.

While the inventive concept has been particularly shown and described with reference to exemplary embodiments thereof, it will be understood that various changes in form and details may be made therein without departing from the spirit and scope of the following claims.

What is claimed is:

1. A method of controlling a stereo convergence, the method comprising:

storing a setup specification information according to preferences of a user, the setup specification information including a plurality of distance ranges;

detecting a plurality of objects from a stereo image comprising a left eye image and a right eye image;

grouping the plurality of objects into a plurality of object groups according to the setup specification information, each of the plurality of object groups corresponding to a different one of the plurality of distance ranges;

selecting one of the plurality of object groups as a selected object group based on the plurality of distance ranges indicated by the setup specification information; and moving at least one of the left eye image and the right eye image of the stereo image to adjust convergence of the selected object group or to adjust convergence of a setup area comprising the selected object group in a horizontal direction or a vertical direction, or in both the horizontal direction and the vertical direction, wherein the plurality of objects are grouped based on distances between an imaging surface of a camera and the plurality of objects.

2. The method of claim 1, further comprising:
correcting a distorted image after moving the at least one of the left eye image and the right eye image.

3. The method of claim 1, wherein the plurality of objects that are detected are included in common in the left eye image and the right eye image of the stereo image.

4. The method of claim 1, wherein the distances between the imaging surface of the camera and the plurality of objects are calculated based on disparity vectors (DVs) of feature points (FPs) of the plurality of objects.

5. The method of claim 1, wherein the setup area comprises grouping of detected objects corresponding to at least one of a particular distance, a particular character, and a particular background, the at least one of the particular distance, the particular character, and the particular background being selected through a user interface.

6. The method of claim 1, wherein at least one of the left eye image and the right eye image of the stereo image is moved in the horizontal direction or the vertical direction, or in both the horizontal direction and the vertical direction, based on a distribution of disparity vectors (DVs) of the selected object group or the setup area comprising the selected object group.

7. The method of claim 1, wherein the moving of the stereo image comprises:
determining an area of interest comprising the selected object group;
extracting feature points (FPs) from the area of interest;
calculating disparity vectors (DVs) by matching portions of the left eye image and the right eye image corresponding to the FPs; and
moving the at least one of the left eye image and the right eye image of the stereo image in the horizontal direction or the vertical direction, or in both the horizontal direction and the vertical direction, according to the distribution of the DVs.

8. The method of claim 1, where the moving of the stereo image comprises:
generating disparity vectors (DVs) of the selected object group or the setup area comprising the selected object group;
determining a convergence adjustment value based on the DVs; and
moving the left eye image in the horizontal direction or the vertical direction, or in both the horizontal direction and the vertical direction, and moving the right eye image in a direction opposite to a movement direction of the left eye image, based on the convergence adjustment value.

9. The method of claim 8, wherein the determining of the convergence adjustment value comprises:
calculating a histogram illustrating a disparity vector (DV) and frequency by using the DVs that are generated; and
calculating the convergence adjustment value for matching a distribution of the DVs of the histogram with an initially set target distribution.

10. A system on chip comprising:
a memory which stores setup specification information according to preferences of a user and image data, the setup specification information including a plurality of distance ranges;
an object detector which detects a plurality of objects from a stereo image comprising a left eye image and a right eye image;
an object classifier which groups the plurality of objects that are detected from the stereo image into a plurality of object groups according to the setup specification information, each of the plurality of object groups corresponding to a different one of the plurality of distance ranges;
a convergence adjustment area determiner that selects one or more of the plurality of object groups from among the plurality of object groups as selected one or more object groups based on the plurality of distance ranges indicated by the setup specification information; and
a convergence adjuster which moves at least one of the left eye image and the right eye image of the stereo image in a horizontal direction or a vertical direction, or in both the horizontal direction and the vertical direction, to adjust a convergence of at least one object in the selected one or more object groups,
wherein the object classifier classifies the plurality of objects into the plurality of object groups based on distances between an imaging surface of a camera and the plurality of objects.

11. The system on chip of claim 10, wherein the convergence adjustment area determiner selects at least one object group from the plurality of object groups, based on an initially set threshold distance, and detects the selected one or more object groups or a setup area comprising the selected one or more object groups.

12. The system on chip of claim 10, wherein the convergence adjuster comprises:
a feature extractor which extracts feature points (FPs) from the left eye image or the right eye image of the stereo image;
a disparity vector (DV) calculator which calculates disparity vectors (DVs) by matching portions of the left eye image and the right eye image corresponding to the FPs; and
a convergence controller which moves the at least one of the left eye image and the right eye image of the stereo image in the horizontal direction or the vertical direction, or in both the horizontal direction and the vertical direction, based on the DVs.

13. The system on chip of claim 12, wherein the convergence controller comprises:
a histogram generator which calculates a histogram illustrating a disparity vector (DV) and frequency by using the disparity vectors (DVs);
a convergence adjustment value calculator which calculates an image movement value in a horizontal direction or a vertical direction, or in both the horizontal direction and the vertical direction, of the left eye image or the right eye image for matching a distribution of DVs of the histogram with a target distribution; and an image mover which moves the at least one of the left eye image and the right eye image in the horizontal direction or the vertical direction, or in both the horizontal direction and the vertical direction, according to the image movement value.

14. The system on chip of claim 10, wherein the convergence adjuster moves the at least one of the left eye image and the right eye image, based on the DVs.

15. A method of controlling a stereo convergence, the method comprising:

storing specification information according to preferences of a user, the specification information including a plurality of distance ranges;

detecting one or more first objects in a left eye image of a stereo image, and one or more second objects in a right eye image of the stereo image;

grouping the one or more first objects and the one or more second objects into a plurality of object groups according to the specification information and characteristics of the one or more first objects and the one or more second objects, each of the plurality of object groups comprising a first object from the left eye image and a second object from the right eye image, and each of the plurality of object groups corresponding to a different one of the plurality of distance ranges;

selecting one of the one or more object groups from among the plurality of object groups as a selected object group based on the plurality of distance ranges indicated by the specification information;

determining feature points (FPs) of objects in the selected object group;

determining disparity vectors (DVs) with respect to the FPs; and moving the left eye image with respect to the right eye image in order to adjust the DVs of at least one object in the selected object group, wherein the one or more first objects and the one or more second objects that are detected are grouped based on distances between an imaging surface of a camera and the one or more first objects and the one or more second objects.

16. The method of claim 15, wherein the left eye image is moved with respect to the right eye image to adjust an average value of the DVs to a target disparity value.

17. The method of claim 15, wherein the specification information includes the plurality of distance ranges, a particular character, and/or a particular background.

* * * * *